Dec. 11, 1962   R. F. ENSIGN ET AL   3,068,085
EQUALIZING SYSTEM FOR GASEOUS FUEL FEEDS FOR
INTERNAL COMBUSTION ENGINES
Filed Jan. 24, 1958   3 Sheets-Sheet 1
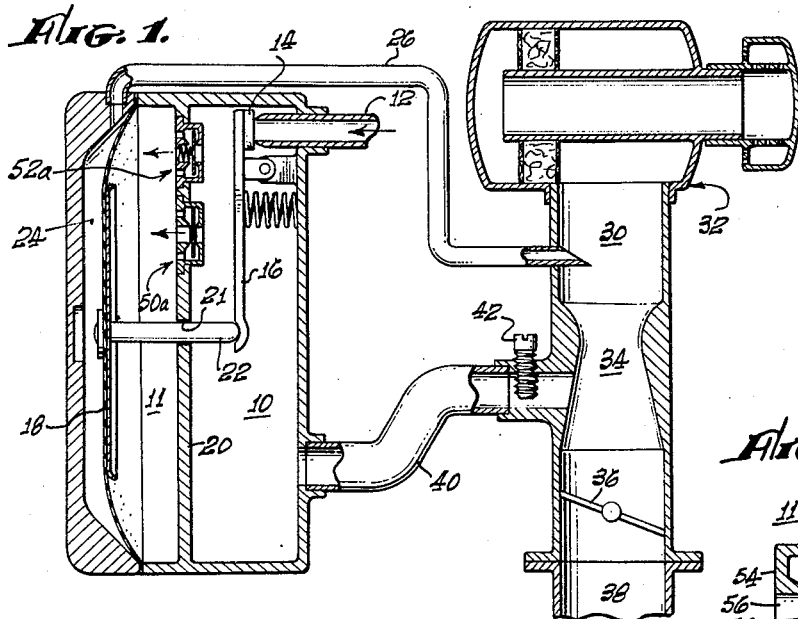
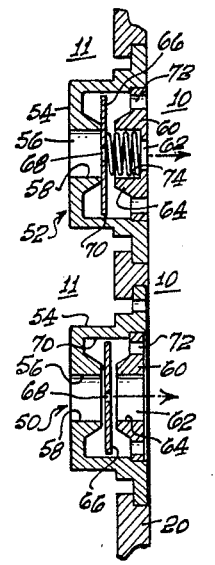
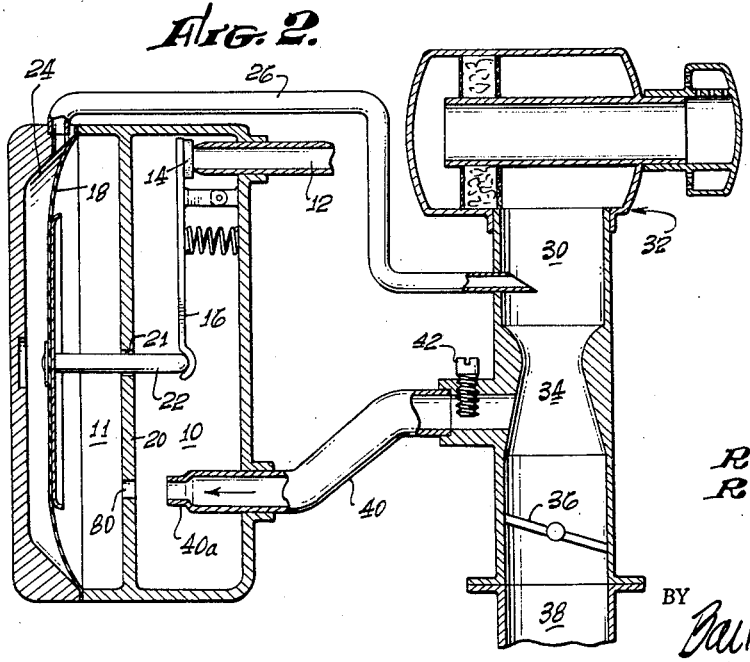
Roy F. Ensign,
Roy K. Ensign,
INVENTORS.
BY *Backelew & Jenis*

Dec. 11, 1962 R. F. ENSIGN ET AL 3,068,085
EQUALIZING SYSTEM FOR GASEOUS FUEL FEEDS FOR
INTERNAL COMBUSTION ENGINES
Filed Jan. 24, 1958 3 Sheets-Sheet 2
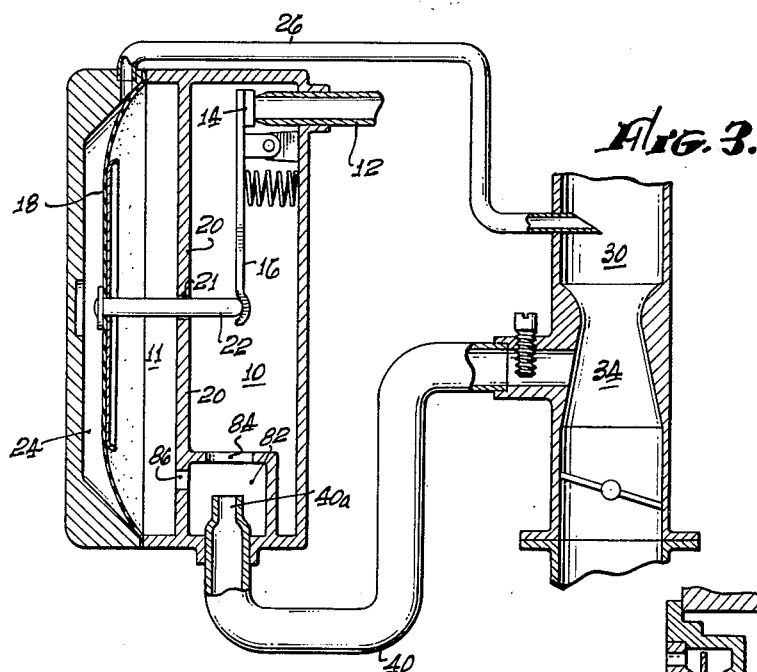
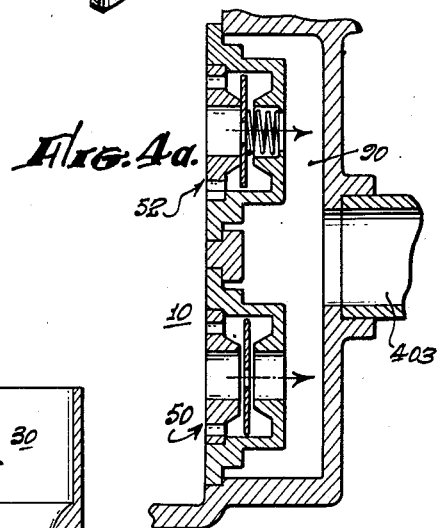
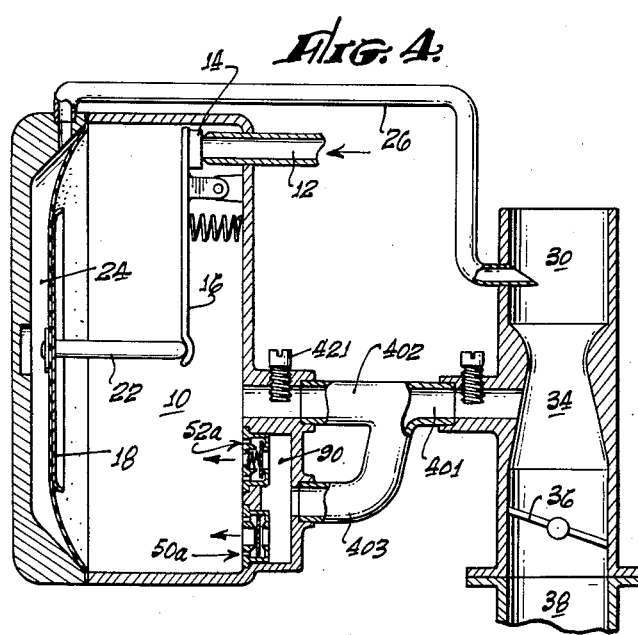
Roy H. Ensign,
Roy K. Ensign,
INVENTORS.
BY Roy F. Ensign,
Roy K. Ensign,
INVENTORS.

BY
Baukelew & Lewis

United States Patent Office 3,068,085
Patented Dec. 11, 1962

3,068,085
EQUALIZING SYSTEM FOR GASEOUS FUEL FEEDS FOR INTERNAL COMBUSTION ENGINES
Roy F. Ensign and Roy K. Ensign, Fullerton, Calif., assignors, by mesne assignments, to American Bosch Arma Corporation, a corporation of New York
Filed Jan. 24, 1958, Ser. No. 711,051
2 Claims. (Cl. 48—184)

This invention concerns systems for maintaining the proper fuel and air mixture ratio, in gaseous fuel systems, at predetermined ratio figures at various engine speeds.

In a typical gaseous fuel feed system, a pressure regulator is employed to deliver gaseous fuel to the venturi of a carbureter at a predetermined pressure which is usually about equal to atmospheric pressure, or the pressure existent at the carbureter air intake. The pressure at which the regulator delivers depends upon the pressures exerted on the valve-and-diaphragm system of the delivery stage of the regulator. There may or may not be springs or other elements exerting constant forces on that system in directions to set the delivery pressure below or above the atmospheric pressure existent in the air intake. But the final control of the delivery pressure is commonly effected by a balance passage that applies the pressure existent in the carbureter air intake to the reference pressure chamber of the delivery stage diaphragm, to make the delivery pressure bear a constant or predetermined relation to the existent air intake pressure. That pressure varies considerably due to the use of air cleaners on the intake and also due to varying frictional and turbulence losses at varying air speeds through the intake.

Although that pressure controlling system may be, in theory, perfect in operation to keep the fuel delivery pressure constant with relation to the air intake pressure, certain serious difficulties arise in connection with certain types of engines operated through ranges of speed and of throttle opening. As an example, these difficulties are pronounced in some ranges and conditions of operation in connection with some four cylinder engines, and perhaps particularly those in which there is rather large overlap between the open phases of the intake and exhaust valves. Due, apparently to pulsing variations of the air pressure in the air intake, the pressure applied via the balance passage to the reference chamber, and/or applied to the regulator delivery chamber via the fuel feed passage connecting into the air passage, tends in some instances to build up, and in others to drop, in certain ranges of engine operation; with the result that the delivery pressure builds up and the fuel and air mixture becomes too rich, or that pressure drops and the mixture becomes too lean. These pressure pulsations and resultant rise or drop in the fuel delivery are increased and aggravated by the length and size of the air intake passage and air cleaner. The precise reason for the changes in delivery pressure due to the pulsations is somewhat obscure. One possible explanatory theory of the cause of the difficulty is that resonant waves are set up in the intake and connected passages; but we do not intend that the invention should be limited by any such theory. It is the general object of the present invention to overcome such pressure change.

The same pressure pulsations are transmitted to the delivery chamber at the opposite face of the delivery stage diaphragm and tend in the same manner to build up or depress the delivery pressure.

The amount of delivery pressure variation depends on the amplitude of the pulses which is found to be greater under some conditions of engine operation and/or in some ranges of operation. It is, among other things, one of the general objects of this invention to overcome those difficulties of delivery pressure variation not only under one set of operating conditions or range, but under a plurality of different conditions. Other objects and accomplishments of the invention, and its manner of operation will appear from the following descriptions of typical and illustrative embodiments, reference being had to the accompanying drawings, in which:

FIG. 1 is a schematic showing of one illustrative embodiment;

FIG. 1a illustrates a modification of the embodiment of FIG. 1;

FIGS. 2 and 3 are schematic showings of other embodiments;

FIG. 4 is a schematic showing of another embodiment, and FIG. 4a illustrates a modification of the embodiment of FIG. 4;

Figure 5:
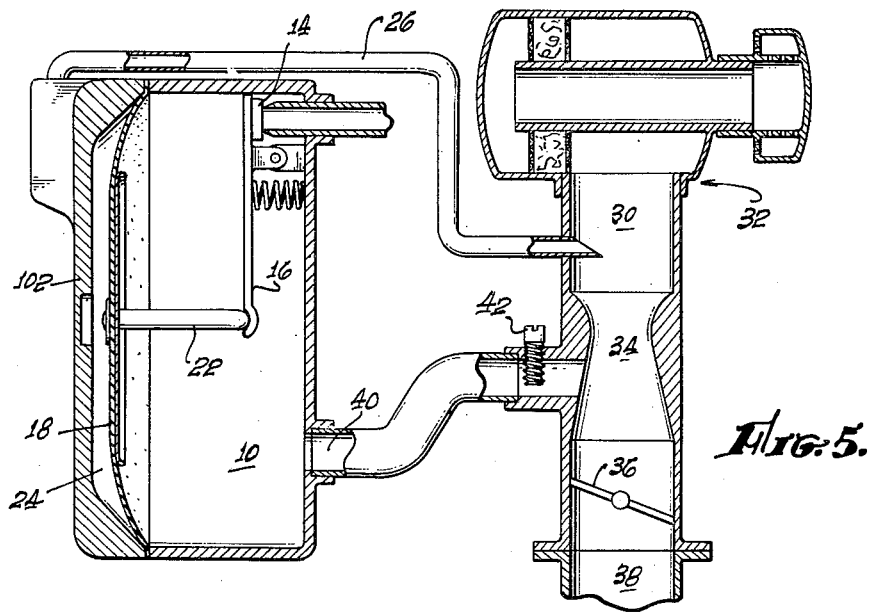
FIG. 5 is a schematic showing of another embodiment.

Referring first to FIG. 1, the delivery stage of a pressure regulator is there schematically shown. The delivery chamber 10 is supplied with fuel gas under pressure via inlet 12 (which may be fed by a previous regulator stage) controlled by valve 14 operated through leverage system 16 by diaphragm 18. A subdivision wall 20 divides a delivery sub-chamber 11 from the main delivery chamber 10. Diaphragm 18 forms one wall of sub-chamber 11, its inner face being exposed to the pressure in that sub-chamber; and the sub-chamber is restrictedly communicated with main chamber 10 via a restricted passage, such for example as the clearance in opening 21 which passes the rod 22 by which diaphragm 18 is connected to valve lever 16.

On its outer face diaphragm 18 is exposed to the pressure existent in reference chamber 24, to which balance tube 26 connects. That balance tube picks up the total pressure in air intake 30 of the carbureter, the air intake being shown as equipped with a typical air cleaner 32. The air and mixture passage of the carbureter has the venturi 34, throttle 36, and connection to the engine manifold at 38. A fuel feed tube 40 leads from delivery chamber 10 to the venturi throat, controlled in effective size by the adjustable screw 42.

As will be evident, diaphragm 18 moves into chamber 11 to open valve 14 and thus raise the pressure in delivery chamber 10 whenever the pressure in 11 is less than that in reference chamber 24. Generally considered, the pressure in 11 is the same as in delivery chamber 10, but the restricted communication between those two chambers enables the maintenance of a differential between those two pressures.

As shown in FIG. 1, a check valve or plurality of check valves are installed in sub-division wall 20. In FIG. 1 these valves open in the direction from chamber 10 to chamber 11; in the modification of FIG. 1a they open from chamber 11 to chamber 10. Referring first to FIG. 1a where the valve structures are better shown at larger scale, each of valves 50 and 52 has a body 54 with an opening 56 surrounded by a valve seat 58. An inserted body disk 60 has an opening 62 and a valve movement limiting seat 64 spacedly facing valve seat 58. Between seats 58 and 64 there is a light disk valve closure 66, composed for example of thin light-weight plastic. The closure preferably has a small central aperture 68 and it clears the interior wall 70 of body 54 so as to allow free passage around it inside the body. Disk 60 has openings 72. Both valves, as shown in FIG. 1a, open to pass fluid from chamber 11, at the left, to chamber 10, at the right. Valve closure 66 of valve 50 floats, without loading in either direction, between seats 58 and 64 to open and close under very slight differences between the pressures in 10 and 11. Closure 66 of valve 52 is biased toward closed position by a light spring 74 so that it opens only at somewhat greater differences in those pressures. The openings 68, as well as the passage at 21, constitute a bleed by-passing the valves.

Going back now to FIG. 1, the valves 50a and 52a are the same as those shown at 50 and 52 in FIG. 1a, except that they are set in wall 20 to open in the direction from chamber 10 to chamber 11.

Assume now that the effect of pressure pulsations in air intake 30, and consequently also at venturi 34, at certain speeds is such as to cause a raising of delivery pressure in 10 and at the venturi throat, resulting in a mixture ratio too rich. Pulsations of greater amplitude cause greater rise in the delivery pressure. The pulsations in 34 are communicated via 40 to chamber 10. On the high phase of each pulsation, one or both valves 50a and 52a will open to pass the high pressure phase into sub-chamber 11. Valve 50a opens at a very low pulsation amplitude to pass the pressure of the high pressure phase into chamber 11. At higher amplitudes, both valves open to pass the higher pressures into 11. By proper sizing of the valve passages, in proportion to the sizes of the leaks at 21 and at 68 in the valves, the resultant increase in pressure in 11, tending to move diaphragm 24 to the left and close valve 14, puts the valve-diaphragm system in balance at a lower pressure in chamber 10, thus eliminating the effect of the pulsations raisings the pressure in chamber 10 and causing a too rich mixture. The amplitude of the pulsations may vary through different ranges of engine operation and also under differing conditions (e.g., different throttle openings) in a given speed range. Several valves, one unloaded, and the other or others progressively loaded more heavily, then tend to controllably affect the pressure in chamber 11 to keep the pressure uniform in 10 throughout varying pulsation amplitudes.

If the pulsation effect is such as to lower the delivery pressure in delivery chamber 10, valves 50 and 52 are arranged, as shown in FIG. 1a, to open in the direction from chamber 11 to chamber 10. Pressure then passes from 11 to 10 on the low pressure phase of the pulsations; the valves acting as before described on pulsations of different amplitudes, but now to lower the pressure in chamber 11 to cause the valve-diaphragm system to move in valve opening direction and raise the pressure in delivery chamber 10.

FIGS. 2 and 3 show other arrangements for increasing or decreasing the pressure in chamber 11 as required to keep the pressure in chamber 10 uniform. The parts similar to those of FIG. 1 are given the same numerals.

In FIG. 2 the delivery tube 40 has its end 40a, preferably in nozzle formation, directed at an aperture 80 in wall 20. The high pressure phase of the pulsations causes fluid flow in 40a in the direction indicated by the arrow (either relative to 40a or relative to the general flow through 40 in the opposite direction) and causes an application or a backing up of pressure on aperture 80. The action on 80 is like that of an injector, causing relative pressure flow into chamber 11 to raise the pressure there, and, correspondingly to decrease the pressure in delivery chamber 10. Pulsations of greater amplitude, which tend to cause greater raising of pressure in 10, increase the injector effect and raise the pressure in 11 higher than do the lesser amplitude pulsations. During the low pressure phases the pressure in 11 bleeds back through 80 into 10, but that back flow is not injector actuated and consequently the pressure in 11 averages higher, and that in 10, lower, than would otherwise be so.

The system of FIG. 2 automatically compensates for the effect of varying pulsation amplitudes that tend to raise the delivery pressure in 10. The arrangement shown in FIG. 3 similarly compensates for the delivery pressure being lowered by pulsation action.

In FIG. 3 delivery tube 40 has its end 40a, in a chamber 82, directed at an aperture 84 which communicates 10 with 82. Aperture 86 in wall 20 communicates chamber 11 with chamber 82, and is located laterally of the axis of 40a and 84, so that the high pressure pulse phase has injector action to draw pressure out of 11. The general action here is the same as in FIG. 2, except that the pulsation phases tend to lower the pressure in chamber 11 causing the valve-diaphragm system to move in its valve opening direction to raise the pressure in delivery chamber 10.

FIGS. 4 and 4a show modifications wherein the check valves of FIGS. 1 and 1a are located in the fuel feed line between the delivery chamber and the carbureter venturi. Parts of FIG. 4 are the same as in FIG. 1 and are given the same numerals. The regulator of FIG. 4 may or may not have the sub-division wall 20 to form a sub-chamber adjacent the diaphragm for facilitating controls other than those spoken of here.

As shown in FIG. 4 the fuel feed line 401 has one branch 402 connecting directly to delivery chamber 10 and adjustably controlled as to effective size by screw 421. Another branch 403 connects with a chamber 90 formed in the wall of chamber 10. Two valves 50a and 52a, the same as those of FIG. 1, open toward the left in the drawing and close toward the right to obstruct flow from 10 to 90 and the feed tube 403, 401. If the pulsation effect is to raise the pressure in delivery chamber 10, the valves close to cut down excessive fuel feed through 403 to 401. The two valves close successively as the pressure increases. The effect of the valve action on the total feed through 401 may be adjusted by adjusting the effective size of the premanently open 402 by suitable setting of screw 421.

If, on the other hand, the pulsation effect is to lower the pressure in delivery chamber 10, the valves 50a and 52a of FIG. 4a open, providing for increased flow from 10 to 401 via 403 to offset the lowered pressure; valve 50a opening on a slight pressure drop in 10, and 52a opening on an increased pressure drop to further increase the compensating flow to 401.

Figures 6, 6A:
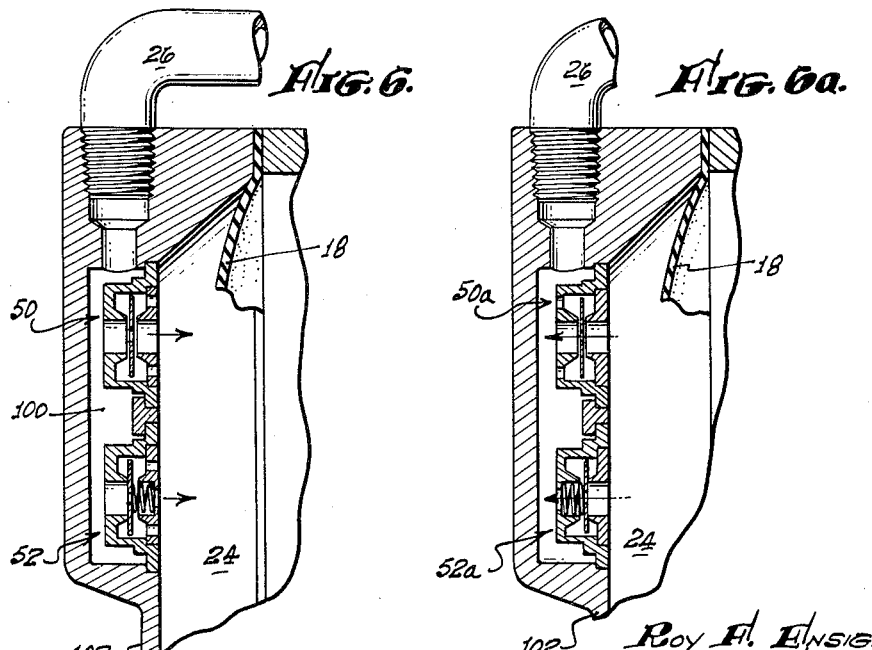
FIG. 6 is an enlarged section of certain parts shown in FIG. 5.
FIG. 6a illustrates a modification of the embodiment shown in FIGS. 5 and 6.

FIGS. 5, 6 and 6a show other modifications in which the sequentially opening valves are applied to the connection of the balance tube 26 to the reference pressure chamber 24. Increase or decrease in pressure in balance chamber 24 correspondingly increases or decreases the delivery pressure in 10, as is well understood. Parts of FIG. 5 are the same as in FIG. 1 and are given the same numerals.

FIG. 6 is a detail section of the upper left hand part shown in FIG. 5, showing how balance tube 26 is connected to reference chamber 24. Tube 26 connects into a chamber 100 formed in wall 102 of balance chamber 24. Valves 50 and 52, the same as those shown in FIG. 1a, open toward the right in the figure to pass fluid from chamber 100 to balance chamber 24. If the pulsation effect is to lower the pressure in delivery chamber 10, then valves 50 and 52 open on the high phase of pulsations reaching them through 26 to raise the pressure in 24, and in 10; valve 52 opening on the pulsations of greater amplitude to augment the action when the delivery pressure tends to drop lower.

On the other hand, if the pulsation action is to raise the delivery pressure in 10, the valves 50a and 52a are reversed in their action, as indicated in FIG. 6a. They then open in sequence to pass fluid from 24 on the low pressure phases of the pulsations, to reduce the pressure in 24 and 10.

In the form of this invention shown in FIGS. 5, 6 and 6a, the valves control the fluid passage 26 that leads directly from the air and mixture passage to the pressure controlling chamber 24. In the form of FIGS. 1 and 1a, the valves control a passage connection, to the pressure controlling chamber 11, that includes delivery passage 40 and the delivery chamber 10.

We claim:

1. In gaseous fuel feed systems for internal combustion engines comprising a carbureter having an air and mixture passage with an air intake, a venturi throat and connection to the engine intake manifold, a gas pressure regulator having a delivery chamber, a gas delivery passage separate from the air and mixture passage and delivering gas from said delivery chamber directly to the venturi throat, a pressure controlling diaphragm-valve system associated with the delivery chamber, a pressure establishing reference chamber at one face of the diaphragm wherein variations of pressure cause corresponding variations of pressure in the delivery chamber, to which last named pressure the opposite face of the diaphragm is exposed, and a balance passage connecting the air intake of the carbureter with said reference chamber normally maintaining pressure in said reference chamber equal to that in the air intake; in combination, improvement means preventing pressure pulsations which occur in the air and mixture passage, and are communicated by the gas delivery passage to the delivery chamber, from causing the pressure in the delivery chamber to vary from its normal relation to the pressure in the reference chamber, said means comprising: a branch in said delivery passage whereby said delivery passage is formed with two branches communicating with the delivery chamber; a check valve associated with only one of said branches for controlling, at least in part, said delivery passage to the venturi throat, and providing relatively free communication between the delivery chamber and the venturi throat in one direction only and relatively restricted communication in the opposite direction, said check valve having a thin valve closure member of light weight, completely non-loaded, and freely movable by pressure pulsations back and forth between closed and open positions, the other of said branches forming a constantly open passage as a part of said delivery passage by-passing the check valve.

2. The improvement means defined in claim 1 and including also a second check valve of the same structure and characteristics as the first named valve, in parallel with the first named valve, controlling the same branch and opening in the same direction, but loaded against opening.

References Cited in the file of this patent

UNITED STATES PATENTS

| | | |
|---|---|---|
| 2,073,299 | Ensign | Mar. 9, 1937 |
| 2,563,288 | Ensign | Aug. 7, 1951 |
| 2,634,088 | Niesemann | Apr. 7, 1953 |
| 2,754,185 | Ensign | July 10, 1956 |
| 2,754,186 | Ensign | July 10, 1956 |
| 2,775,984 | Dahl | Jan. 1, 1957 |
| 2,886,065 | Hershman | May 12, 1959 |